US011877033B2

(12) United States Patent
Tian et al.

(10) Patent No.: US 11,877,033 B2
(45) Date of Patent: Jan. 16, 2024

(54) QUALIFICATION TEST IN SUBJECT SCORING

(71) Applicant: Tencent America LLC, Palo Alto, CA (US)

(72) Inventors: Jun Tian, Belle Mead, NJ (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 85 days.

(21) Appl. No.: 17/752,551

(22) Filed: May 24, 2022

(65) Prior Publication Data

US 2023/0007349 A1 Jan. 5, 2023

Related U.S. Application Data

(60) Provisional application No. 63/217,439, filed on Jul. 1, 2021.

(51) Int. Cl.
*H04N 21/475* (2011.01)
*G06T 19/00* (2011.01)

(52) U.S. Cl.
CPC ....... *H04N 21/4756* (2013.01); *G06T 19/006* (2013.01)

(58) Field of Classification Search
CPC ................. H04N 21/4756; G06T 19/006
See application file for complete search history.

(56) References Cited

U.S. PATENT DOCUMENTS

| 9,578,379 | B1 * | 2/2017 | Klappert | ............ | H04N 21/4756 |
| 2018/0130075 | A1 * | 5/2018 | Roy | ................... | H04N 21/4756 |
| 2022/0164520 | A1 * | 5/2022 | Dolan | ................... | G06F 40/106 |

FOREIGN PATENT DOCUMENTS

CN 107948748 A * 4/2018 ....... H04N 21/25891

OTHER PUBLICATIONS

Draft MPEG-I Immersive Audio Test and Evaluation Procedures, WG 6, MPEG Audio Coding, ISO/IEC JTC1/SC29/WG6 N0058, Apr. 30, 2021, 27 pages.
Extended European Search Report in EP22834362.0, dated Oct. 20, 2023, 7 pages.
Zhou et al., "Modeling the Impact of Spatial Resolutions on Perceptual Quality of Immersive Image/Video," 2016 International Conference on 3D Imaging (IC3D), Dec. 13, 2016, pp. 1-6.

* cited by examiner

*Primary Examiner* — Jefferey F Harold
*Assistant Examiner* — Alexander Boyd
(74) *Attorney, Agent, or Firm* — ARENTFOX SCHIFF LLP

(57) ABSTRACT

Aspects of the disclosure provide methods and apparatuses for subjective evaluation. In some examples, processing circuitry receives scores graded by a subject to a media presentation. The scores by the subject includes a plurality of self comparison scores that are graded to self comparison tests in the media presentation. The processing circuitry applies a first rule and a second rule to the plurality of self comparison scores. The first rule requires a first subset of the plurality of self comparison scores in a first range. The second rule requires a second subset of the plurality of self comparison scores in a second range to limit at least an outlier to the first rule according to the second range. The processing circuitry determines that the scores by the subject are qualified for the subjective evaluation in response to the first rule and the second rule being satisfied.

18 Claims, 4 Drawing Sheets

| Score (Score Difference) | Indication |
|---|---|
| 3 | Much Better |
| 2 | Better |
| 1 | Slightly Better |
| 0 | The Same |
| -1 | Slightly Worse |
| -2 | Worse |
| -3 | Much Worse |

*FIG. 2*

QUALIFICATION TEST IN SUBJECT SCORING

INCORPORATION BY REFERENCE

This present disclosure claims the benefit of priority to U.S. Provisional Application No. 63/217,439, "Qualification Test in Subject Scoring" filed on Jul. 1, 2021, which is incorporated by reference herein in its entirety.

TECHNICAL FIELD

The present disclosure describes embodiments generally related to subjective evaluation.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In an application of virtual reality or augmented reality, to make a user have the feeling of presence in the virtual world of the application, audio in a virtual scene of the application is perceived as in real world, with sounds coming from associated virtual figures of the virtual scene. In some examples, physical movement of the user in the real world is perceived as having matching movement in the virtual scene in the application. Further, and importantly, the user can interact with the virtual scene using audio that is perceived as realistic and matches the user's experience in the real world.

SUMMARY

Aspects of the disclosure provide methods and apparatuses for subjective evaluation. In some examples, an apparatus for subjective evaluation includes processing circuitry. The processing circuitry receives scores graded by a subject to a media presentation (e.g., an immersive audio or video media presentation). The scores by the subject includes a plurality of self comparison scores that are graded to self comparison tests in the media presentation. The processing circuitry applies a first rule and a second rule to the plurality of self comparison scores. The first rule requires a first subset of the plurality of self comparison scores in a first range. The second rule requires a second subset of the plurality of self comparison scores in a second range to limit at least an outlier score in the plurality of self comparison scores to the first rule according to the second range. The processing circuitry determines that the scores of the subject are qualified for the subjective evaluation when the first rule and the second rule are satisfied.

In some embodiments, the first rule includes a requirement that at least N1 self comparison scores are within the first range of [−M1, M1], N1 is a first positive integer less than or equal to N−1, and N is a total number of the self comparison tests. The second rule includes a requirement that at least N2 self comparison scores are within the second range of [−M2, M2], N2 is a second positive integer less than or equal to N, M1 and M2 each is a positive number.

In some embodiments, the first rule includes a requirement that at least N−1 self comparison scores are within the first range of [−M1, M1]; and the second rule includes a requirement that all N self comparison scores are within the second range of [−M2, M2].

In some embodiments, the processing circuitry excludes the scores of the subject for the subjective evaluation when the plurality of self comparison scores fails at least one of the first rule and the second rule.

In some examples, the scores comprises 4 self comparison scores, the first rule requires 3 out of the 4 self comparison scores in the first range, and the second rule requires the 4 self comparison scores in the second range. In an example, the first range is [−0.5, 0.5], and the second range is [−1.5, 1.5].

In some examples, the first rule requires a majority (e.g., >=50%) of the plurality of self comparison scores in the first range. In some examples, the second rule requires that more self comparison scores than the majority of the plurality of self comparison scores are within the second range. In an example, the second rule requires that the plurality of self comparison scores are within the second range.

In some examples, the first rule requires, at most one outlier in the plurality of self comparison scores not in the first range, and the second rule requires the plurality of self comparison scores in the second range.

In some examples, the second range includes the first range and is at least two times of the first range.

In some examples, the first rule requires the first subset of the plurality of self comparison scores in the first range, and the second rule requires no self comparison score outside of the second range.

Aspects of the disclosure also provide a non-transitory computer-readable medium storing instructions which when executed by a computer cause the computer to perform the method for subjective evaluation.

BRIEF DESCRIPTION OF THE DRAWINGS

Further features, the nature, and various advantages of the disclosed subject matter will be more apparent from the following detailed description and the accompanying drawings in which:

FIG. 2 shows an example of grade scale for a comparison test in some examples.

DETAILED DISCRETION OF EMBODIMENTS

Aspects of the disclosure provide techniques for use in subjective evaluation for media quality, such as audio processing quality, image processing quality, video processing quality, and the like.

According to some aspects of the disclosure, some technologies attempt to create, or imitate the physical world through digital simulation that is referred to as immersive media. Immersive media processing can be implemented according an immersive media standard, such as Moving Picture Expert Group Immersive (MPEG-I) suite of standards, including "immersive audio", "immersive video", and "systems support." The immersive media standard can support a VR or an AR presentation in which the user can navigate and interact with the environment using 6 degrees of freedom (6 DoF), that include spatial navigation (x, y, z) and user head orientation (yaw, pitch, roll).

Figure 1:
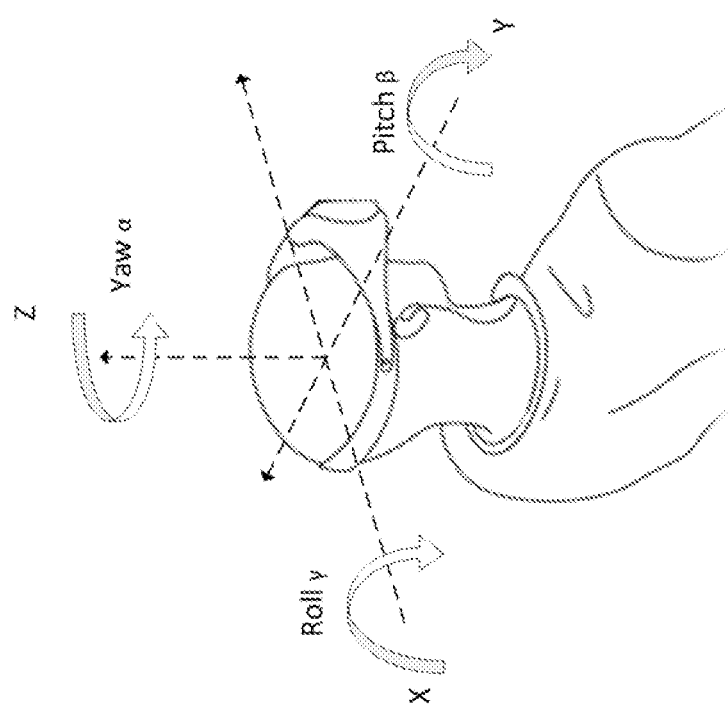
FIG. 1 shows a diagram illustrating an environment using 6 degrees of freedom (6 DoF) in some examples.

FIG. 1 shows a diagram illustrating an environment using 6 degrees of freedom (6 DoF) in some examples. The 6 degrees of freedom (6 DoF) can be represented by a spatial navigation (x, y, z) and a user head orientation (yaw, pitch, roll).

According to an aspect of the disclosure, immersive media can be used to impart the feeling that a user is actually present in the virtual world. In some examples, audio of a scene is perceived as in the real world, with sounds coming from associated visual figures. For example, sounds are perceived with the correct location and distance in the scene. Physical movement of the user in the real world is perceived as having matching movement in the scene of the virtual world. Further, the user can interact with the scene and cause sounds that are perceived as realistic and matching the user's experience in the real world.

Generally, subjective evaluation can be used to evaluate media quality as experience by humans. In some examples, objective evaluation, such as peak signal-to-noise ratio (PSNR), may not correlate well with what a human perceives. The subjective evaluation emphasizes how media is perceived by humans (also referred to as subjects) and evaluates media quality based on subjects' opinions.

It is noted that while subjective evaluation of audio quality is used as examples in the following description of techniques for subjective evaluation, the techniques for subjective evaluation can be used in subjective evaluation of media quality of other media type, such as image, video, and the like.

According to some aspects of the disclosure, to perform subjective evaluation, subjects are selected to form a subject panel. Then, a media presentation can be performed to the subjects, the media presentation includes tests, and the subjects can grade the tests in the media presentation by scores. The scores are collected, and data processing is performed on the scores and other suitable information related to the subjective evaluations. Statistical methods can be used to analyze the scores, and media quality can be interpretated based on the statistical analysis.

During the data processing, to have a reliable and consistent subjective evaluation, a qualification test, also referred to as post-screening, is conducted on subject scoring. For subjects whose scores that are not reliable, or not consistent, their scores will be excluded from subjective evaluation in some examples.

The qualification test, also referred to as a post-screening, is based on self-comparison tests in the media presentation.

Generally, comparison tests are used compare a first media with a second media. In an example, the first media can be processed, for example, coded, rendered by a technique under evaluation, and the second media can be a reference media. During a comparison test, the first media and the second media are presented to a subject, and the subject can give a score to indicate an assessment of the quality difference.

FIG. 2 shows an example of grade scale for comparison test. In the FIG. 2 example, scores are ranged from −3 to 3. Score 0 indicates that the first media and the second media are about the same quality; score −1 indicates that the first media is slightly worse than the second media; score 1 indicates the first media is slightly better than the second media; score −2 indicates that the first media is worse than the second media; score 2 indicates the first media is better than the second media; score −3 indicates that the first media is much worse than the second media; score 3 indicates the first media is much better than the second media.

It is noted that while the scores in FIG. 2 example are integers, non integer numbers can be used as scores. In some examples, a minimum change unit in scores is 0.5. For example, following scores can be used to grade the comparison tests: 3, 2.5, 2, 1.5, 1, 0.5, 0, −0.5, −1, −1.5, −2, −2.5, −3. The score of a comparison test is also referred to as score difference in some examples.

According to an aspect of the disclosure, during presentation of comparison tests to a subject, self comparison tests (also referred to as self comparison trials) can be mixed with regular comparison tests without informing the subject, and scores collected from the self comparison tests can be used for post screening. When presenting a self comparison test, the first media and the second media are of the same media, such as processed by same codec, same render and the like. Thus, large values (e.g., large absolute values) in the scores graded by a subject to the self comparison tests may indicate scores of the subject are not reliable, or not consistent for subjective evaluation. A score for a self comparison test is referred to as a self comparison score in some examples.

In some examples, a listener (subject for audio quality evaluation)'s file for audio playback (audio presentation) includes 4 self comparison tests in addition to other tests. During the audio playback according to the listener's file, the listener grades all the tests by scores. After the audio playback, the scores by the subject to all the tests are collected, and scores of the 4 self comparison tests are used in post screening to determine whether the scores by the listener can be used for further data analysis and media evaluation.

In a related example, a rule is applied in the post screening based on scores of self comparison tests of a subject. The rule specifies qualification of subjects whose scores can be used for further data analysis and media evaluation. Specifically, when at least 3 out of 4 self comparison scores are within the score difference range from −0.5 to 0.5 ([−0.5, 0.5]), the scores by the subject are retained and used in further media evaluation. If two or more scores are out of the score difference range from −0.5 to 0.5 ([−0.5,0.5]), the scores by the subject are excluded from further data analysis and media evaluation, in some examples.

In the related example, the post-screening is capable of excluding a subject who has 2 (out of 4) or more self-comparison scores that are outside the score difference range from −0.5 to 0.5 ([−0.5,0.5]). However, some subjects that would pass the post-screening with 3 self comparison scores within the score different range from −0.5 to 0.5 ([−0.5,0.5]), but one self comparison score as high as 3.0 or as low as −3.0. Due to the high variation, scores by such subjects cannot be considered as reliable in some examples, and may need to excluded from the subjective evaluation.

Aspects of the disclosure provide multi-rule techniques for post-screening, and enhance score reliability for subjective evaluation.

According to some aspects of the disclosure, two rules can be applied in the post screening based on scores of self comparison tests by a subject. The first rule specifies qualification of subjects based on a majority of the self comparison scores (e.g., over 50% of the self comparison scores), and the second rule specifies qualification of subjects based on outliers (self comparison scores outside of the first range) in the self comparison scores. When self comparison scores of a subject satisfy both rules, then the scores by the subject can be used in further data analysis and media evaluation. When self comparison scores by a subject fails at least one of the two rules, then the scores by the subject are excluded from further data analysis and media evaluation.

According to an aspect of the disclosure, the first rule limits the majority of the self comparison scores of a qualified subject (subject whose scores are qualified for further data analysis and media evaluation after post screening) in a narrow range, and the second rule limits outliers of the self comparison scores of a qualified subject not having too much variation from the majority of the self comparison scores.

In an example, the first rule can be expressed as: at least 3 (out of 4) self comparison scores are within a score difference range, e.g., from −0.5 to 0.5 ([−0.5,0.5]); and the second rule can be expressed as all 4 self comparison scores are within another score difference range, e.g., from −1.5 to 1.5 ([−1.5,1.5]). In this example, the majority of the self comparison scores of a qualified subject (subject whose scores are qualified for further data analysis and media evaluation after post screening) is limited in a narrow range (e.g., from −0.5 to 0.5), denoted by [−Vmajority, Vmajority], (Vmajority is a positive number, such as 0.5). The outliers of the self comparison scores of a qualified subject are limited not having too much variation from the majority of the self comparison scores, such as limited in a range of [−3×Vmajority, 3×Vmajority]).

In the above example, when a self comparison score by a subject is out of the first range (e.g., [−0.5,0.5]), the self comparison score is referred to as an outlier self comparison score. When the outlier self comparison score has too much variation (e.g., outside [−1.5, 1.5])), scores by the subject is excluded from further data analysis and media evaluation. With the above two rules in post-screening, all 4 self comparison are constrained in a given score range, such that there will be no high self comparison difference score, such as 3.0 or low self comparison score such as −3.0. Thus, those subjects with high self comparison score or low self comparison score, (even though may have only one high self comparison score or low self comparison score), will be excluded from subjective evaluation.

In some examples, a post screening is based on N self comparison scores, and N is a positive number. The post screening uses two rules based on the N self comparison scores. The first rule can be expressed as: at least N−1 self comparison scores are within a score difference range, such as [−$M_1$, $M_1$]; and the second rule can be expressed as all N self comparison scores are within another score difference range, such as [−$M_2$, $M_2$], where $M_1$, $M_2$ are positive numbers, and $M_2$ can be greater than or equal to $M_1$.

In above examples, the majority of the self comparison scores of a qualified subject (subject whose scores are qualified for further data analysis and media evaluation after post screening) is limited in a narrow range (e.g., from [−$M_1$, $M_1$]), and outliers (e.g., self comparison scores outside of [−$M_1$, $M_1$]) of the self comparison scores of a qualified subject are limited not having too much variation from the majority of the self comparison scores, such as limited in the range [−$M_2$, $M_2$].

In some examples, a post screening is based on N self comparison scores, and N is a positive number. The post screening uses two rules based on the N self comparison scores. The first rule can be expressed as at least $N_1$ self-comparison scores are within a score difference range, such as [−$M_1$, $M_1$], where $N_1$ is a positive integer less than or equal to N−1, and $M_1$ is a positive number. The second rule can be expressed as at least $N_2$ self-comparison scores are within another score difference range, such as [−$M_2$, $M_2$], where $N_2$ is a positive integer that is less than or equal to N, $M_2$ is a positive number, and $M_2$ can be greater than or equal to $M_1$. It is noted that $N_2$ can be greater than or equal to $N_1$.

Figure 3:
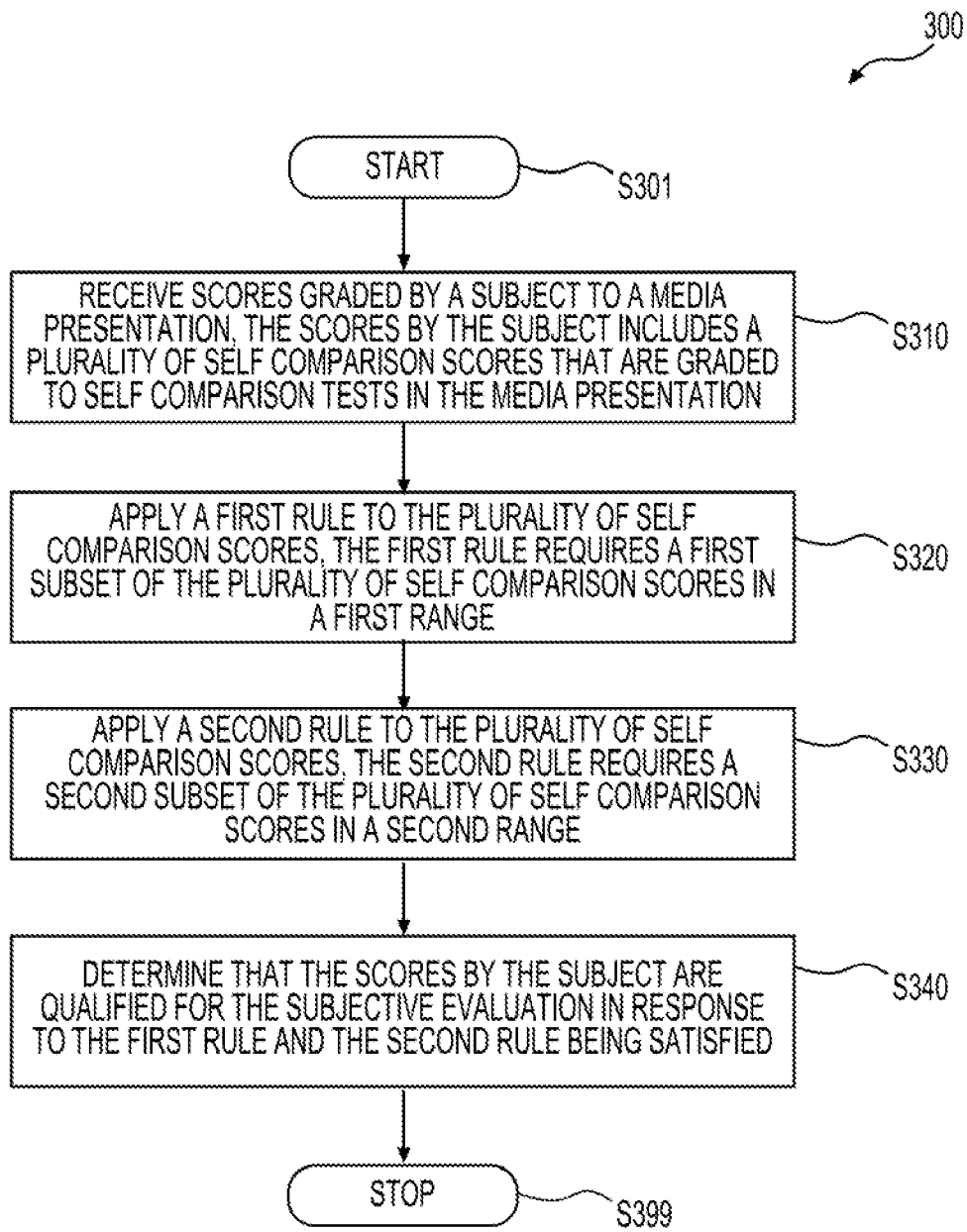
FIG. 3 shows a flow chart outlining another process according to some embodiment of the disclosure.

FIG. 3 shows a flow chart outlining a process (300) according to an embodiment of the disclosure. The process (300) can be used in a subjective evaluation. In some embodiments, the process (300) is implemented in software instructions, thus when the processing circuitry executes the software instructions, the processing circuitry performs the process (300). The process starts at (S301) and proceeds to (S310).

At (S310), scores graded by a subject in response to a media presentation (e.g., an immersive audio or video media presentation) is received. The scores by the subject includes a plurality of self comparison scores that are graded to self comparison tests in the media presentation.

At (S320), a first rule is applied to the plurality of self comparison scores. The first rule requires a first subset of the plurality of self comparison scores in a first range.

At (S330), a second rule is applied to the plurality of self comparison scores. The second rule requires a second subset of the plurality of self comparison scores in a second range to limit at least an outlier in the plurality of self comparison scores to the first rule according to the second range.

In some embodiments, the first rule includes a requirement that at least $N_1$ self comparison scores are within the first range of [−$M_1$, $M_1$], $N_1$ is a first positive integer less than or equal to N−1, and N is a total number of the self comparison scores. The second rule includes a requirement that at least N2 self comparison scores are within the second range of [−$M_2$, $M_2$], N2 is a second positive integer less than or equal to N, $M_1$ and $M_2$ each is a positive number.

In some embodiments, the first rule includes a requirement that at least N−1 self comparison scores are within the first range of [−$M_1$, $M_1$]; and the second rule includes a requirement that all N self comparison scores are within the second range of [−$M_2$, $M_2$].

In some examples, the scores comprises 4 self comparison scores, the first rule requires 3 out of the 4 self comparison scores in the first range, and the second rule requires the 4 self comparison scores in the second range. In an example, the first range is [−0.5, 0.5], and the second range is [−1.5, 1.5].

In some examples, the first rule requires a majority of the plurality of self comparison scores in the first range. In some examples, the second rule requires that more self comparison scores than the majority of the plurality of self comparison scores are within the second range. In an example, the second rule requires that the plurality of self comparison scores are within the second range.

In some examples, the first rule requires, at most one outlier in the plurality of self comparison scores not in the first range, and the second rule requires the plurality of self comparison scores in the second range.

In some examples, the second range includes the first range and is at least two times (e.g., 2 times, 3 times and the like) of the first range.

In some examples, the first rule requires the first subset of the plurality of self comparison scores in the first range, and the second rule requires no self comparison score outside of the second range.

At (S340), when the plurality of self comparison scores satisfy the first rule and the second rule, the scores by the subject are determined to qualify for the subjective evaluation.

In some examples, the scores by the subject are excluded from the subjective evaluation when the plurality of self comparison scores fails at least one of the first rule and the second rule.

Then, the process proceeds to (S399) and terminates.

The process (300) can be suitably adapted. Step(s) in the process (300) can be modified and/or omitted. Additional step(s) can be added. Any suitable order of implementation can be used.

The techniques described above, can be implemented as computer software using computer-readable instructions and physically stored in one or more computer-readable media. For example, FIG. 4 shows a computer system (400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 4:
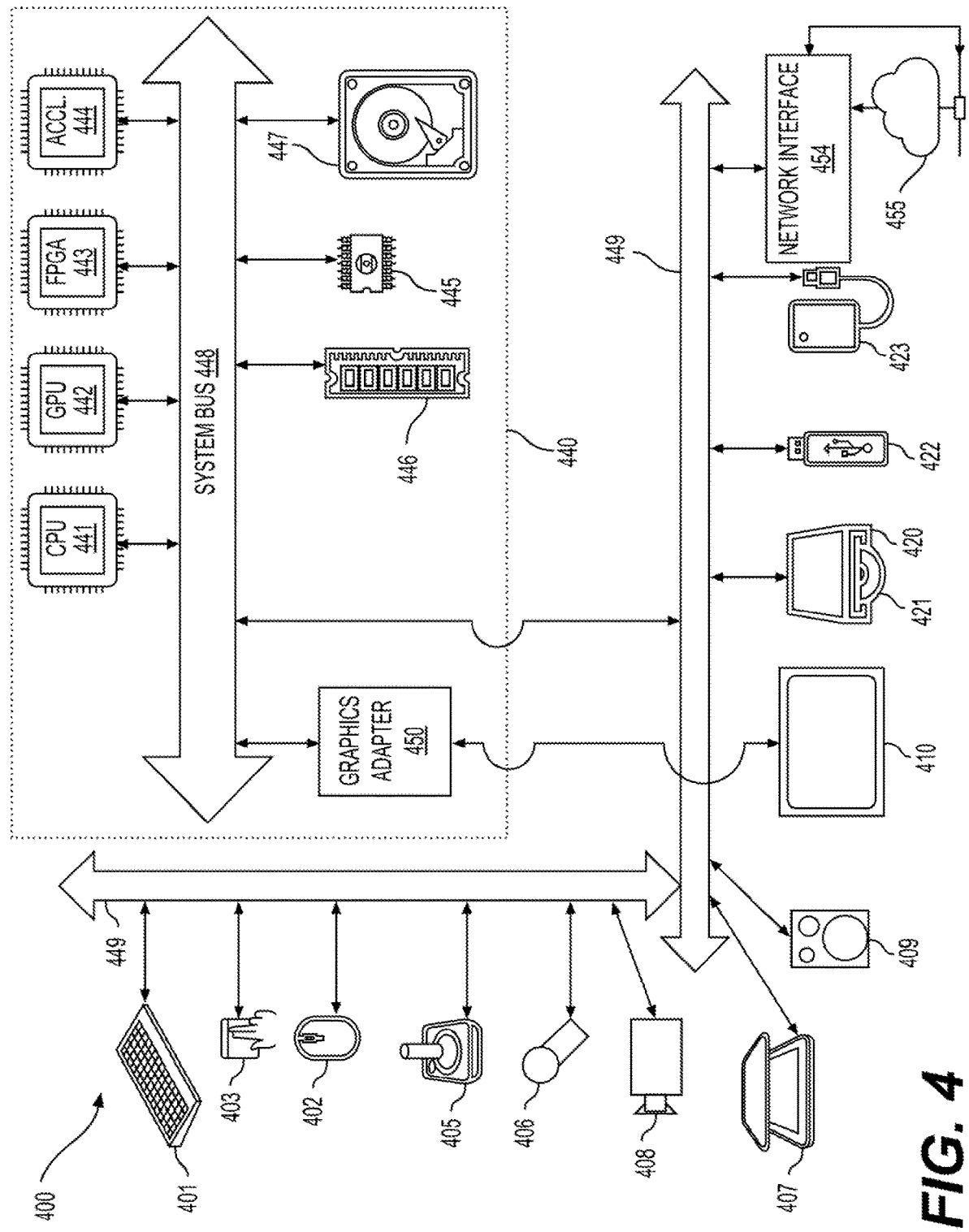
FIG. 4 is a schematic illustration of a computer system in accordance with an embodiment.

The components shown in FIG. 4 for computer system (400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (400).

Computer system (400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (401), mouse (402), trackpad (403), touch screen (410), data-glove (not shown), joystick (405), microphone (406), scanner (407), camera (408).

Computer system (400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (410), data-glove (not shown), or joystick (405), but there can also be tactile feedback devices that do not serve as input devices), audio output devices (such as: speakers (409), headphones (not depicted)), visual output devices (such as screens (410) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (400) can also include human accessible storage devices and their associated media such as optical media including CD/DVD ROM/RW (420) with CD/DVD or the like media (421), thumb-drive (422), removable hard drive or solid state drive (423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (400) can also include an interface (454) to one or more communication networks (455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (449) (such as, for example USB ports of the computer system (400)); others are commonly integrated into the core of the computer system (400) by attachment to a system bus as described below (for example Ethernet interface into a PC computer system or cellular network interface into a smartphone computer system). Using any of these networks, computer system (400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (440) of the computer system (400).

The core (440) can include one or more Central Processing Units (CPU) (441), Graphics Processing Units (GPU) (442), specialized programmable processing units in the form of Field Programmable Gate Areas (FPGA) (443), hardware accelerators for certain tasks (444), graphics adapters (450), and so forth. These devices, along with Read-only memory (ROM) (445), Random-access memory (446), internal mass storage such as internal non-user accessible hard drives, SSDs, and the like (447), may be connected through a system bus (448). In some computer systems, the system bus (448) can be accessible in the form of one or more physical plugs to enable extensions by additional CPUs, GPU, and the like. The peripheral devices can be attached either directly to the core's system bus (448), or through a peripheral bus (449). In an example, the screen (410) can be connected to the graphics adapter (450). Architectures for a peripheral bus include PCI, USB, and the like.

CPUs (441), GPUs (442), FPGAs (443), and accelerators (444) can execute certain instructions that, in combination, can make up the aforementioned computer code. That computer code can be stored in ROM (445) or RAM (446). Transitional data can be also be stored in RAM (446), whereas permanent data can be stored for example, in the internal mass storage (447). Fast storage and retrieve to any of the memory devices can be enabled through the use of cache memory, that can be closely associated with one or more CPU (441), GPU (442), mass storage (447), ROM (445), RAM (446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (400), and specifically the core (440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (440) that are of non-transitory nature, such as core-internal mass storage (447) or ROM (445). The software implementing various embodiments of the present disclosure can be stored in such devices and executed by core (440). A computer-readable medium can include one or more memory devices or chips, according to particular needs. The software can cause the core (440) and specifically the processors therein (including CPU, GPU, FPGA, and the like) to execute particular processes or particular parts of particular processes described herein, including defining data structures stored in RAM (446) and modifying such data structures according to the processes defined by the software. In addition or as an alternative, the computer system can provide functionality as a result of logic hardwired or otherwise embodied in a circuit (for example: accelerator (444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of a subjective evaluation, comprising:
   receiving scores graded by a subject to an immersive audio or video media presentation, the scores by the subject comprising a plurality of self comparison scores being graded to self comparison tests in the immersive audio or video media presentation;
   applying a first rule to the plurality of self comparison scores, the first rule requiring a first subset of the plurality of self comparison scores in a first range;
   applying a second rule to the plurality of self comparison scores, the second rule requiring a second subset of the plurality of self comparison scores in a second range to limit at least an outlier score in the plurality of self comparison scores to the first rule according to the second range; and
   determining that the scores by the subject are qualified for the subjective evaluation in response to the first rule and the second rule being satisfied,
   wherein the scores comprise 4 self comparison scores to 4 self comparison tests;
   wherein the first rule comprises a requirement that at least 3 self comparison scores are within the first range of [−0.5, 0.5]; and
   wherein the second rule comprises a requirement that all 4 self comparison scores are within a second range of [−1.5, 1.5].

2. The method of claim 1,
   wherein the first rule comprises a requirement that at least N1 self comparison scores are within a range of [−M1, M1], N1 being a first positive integer less than or equal to N−1, and N being a total number of the self comparison tests; and
   wherein the second rule comprises a requirement that at least N2 self comparison scores are within a range of [−M2, M2], N2 being a second positive integer less than or equal to N, M1 and M2 each being a positive number.

3. The method of claim 2,
   wherein the first rule comprises a requirement that at least N−1 self comparison scores are within the range of [−M1, M1]; and
   wherein the second rule comprises a requirement that N self comparison scores are within the range of [−M2, M2].

4. The method of claim 1, further comprising:
   excluding the scores by the subject from the subjective evaluation in response to the plurality of self comparison scores failing at least one of the first rule and the second rule.

5. The method of claim 1, wherein the first rule requires a majority of the plurality of self comparison scores in the first range, and the plurality of self comparison scores are within the second range.

6. The method of claim 1, wherein the first rule requires, at most one outlier in the plurality of self comparison scores not in the first range, and the second rule requires the plurality of self comparison scores in the second range.

7. The method of claim 1, wherein the second range includes the first range.

8. The method of claim 7, wherein the second range is at least two times of the first range.

9. The method of claim 1, wherein the second rule requires no self comparison score outside of the second range.

10. An apparatus for a subjective evaluation, comprising processing circuitry configured to:
    receive scores graded by a subject to an immersive audio or video media presentation, the scores by the subject comprising a plurality of self comparison scores being graded to self comparison tests in the immersive audio or video media presentation;
    apply a first rule to the plurality of self comparison scores, the first rule requiring a first subset of the plurality of self comparison scores in a first range;
    apply a second rule to the plurality of self comparison scores, the second rule requiring a second subset of the plurality of self comparison scores in a second range to limit at least an outlier score in the plurality of self comparison scores to the first rule according to the second range; and determine that the scores by the subject are qualified for the subjective evaluation in response to the first rule and the second rule being satisfied, wherein the scores comprise 4 self comparison scores to 4 self comparison tests;

wherein the first rule comprises a requirement that at least 3 self comparison scores are within the first range of [−0.5, 0.5]; and wherein the second rule comprises a requirement that all 4 self comparison scores are within a second range of [−1.5, 1.5].

11. The apparatus of claim 10, wherein the first rule comprises a requirement that at least N1 self comparison scores are within a range of [−M1, M1], N1 being a first positive integer less than or equal to N−1, and N being a total number of the self comparison tests; and wherein the second rule comprises a requirement that at least N2 self comparison scores are within a range of [−M2, M2], N2 being a second positive integer less than or equal to N, M1 and M2 each being a positive number.

12. The apparatus of claim 11, wherein the first rule comprises a requirement that at least N−1 self comparison scores are within the range of [−M1, M1]; and wherein the second rule comprises a requirement that at least N self comparison scores are within the range of [−M2, M2].

13. The apparatus of claim 10, wherein the processing circuitry is configured to:

exclude the scores of the subject from the subjective evaluation in response to the plurality of self comparison scores failing at least one of the first rule and the second rule.

14. The apparatus of claim 10, wherein the first rule requires a majority of the plurality of self comparison scores in the first range and the second rule requires that the plurality of self comparison scores are within the second range.

15. The apparatus of claim 10, wherein the first rule requires, at most one outlier in the plurality of self comparison scores not in the first range, and the second rule requires the plurality of self comparison scores in the second range.

16. The apparatus of claim 10, wherein the second range includes the first range and is at least two times of the first range.

17. The apparatus of claim 10, wherein the second rule requires no self comparison score outside of the second range.

18. A non-transitory computer-readable storage medium storing instructions which when executed by at least one processor cause the at least one processor to perform:

receiving scores graded by a subject to an immersive audio or video media presentation, the scores by the subject comprising a plurality of self comparison scores being graded to self comparison tests in the immersive audio or video media presentation;

applying a first rule to the plurality of self comparison scores, the first rule requiring a first subset of the plurality of self comparison scores in a first range;

applying a second rule to the plurality of self comparison scores, the second rule requiring a second subset of the plurality of self comparison scores in a second range to limit at least an outlier score in the plurality of self comparison scores to the first rule according to the second range; and determining that the scores by the subject are qualified for a subjective evaluation in response to the first rule and the second rule being satisfied, wherein the scores comprise 4 self comparison scores to 4 self comparison tests;

wherein the first rule comprises a requirement that at least 3 self comparison scores are within the first range of [−0.5, 0.5]; and wherein the second rule comprises a requirement that all 4 self comparison scores are within a second range of [−1.5, 1.5].

* * * * *